United States Patent [19]

Chu

[11] Patent Number: 4,740,341

[45] Date of Patent: Apr. 26, 1988

[54] LINEAR POLYETHYLENE, FLUOROCARBON POLYMER AND POLYALKYLSILOXANE COMPOSITIONS, AND IMPROVED METHOD OF FILM EXTRUSION USING SAME

[75] Inventor: Shaw-Chang Chu, Belle Mead, N.J.

[73] Assignee: Mobil Oil Corporation, New York, N.Y.

[21] Appl. No.: 901,699

[22] Filed: Aug. 29, 1986

[51] Int. Cl.$^4$ .................. B29C 47/00; B29D 7/01; C08F 299/08; C08L 27/12

[52] U.S. Cl. .................. 264/211; 264/331.11; 264/331.14; 264/331.17; 525/199; 525/479

[58] Field of Search .................. 264/127, 211, 331.14, 264/331.17, 331.11; 525/199, 479

[56] References Cited

U.S. PATENT DOCUMENTS

| | | | |
|---|---|---|---|
| 2,888,419 | 5/1959 | Safford | 264/211 X |
| 3,125,547 | 3/1964 | Blatz | 525/199 |
| 3,865,897 | 2/1975 | Falender et al. | 264/211 X |
| 3,929,708 | 12/1975 | Brady et al. | 264/211 X |
| 4,076,698 | 2/1978 | Anderson et al. | 526/348.6 |

FOREIGN PATENT DOCUMENTS

| | | | |
|---|---|---|---|
| 655293 | 1/1963 | Canada | 525/199 |
| 934468 | 8/1963 | United Kingdom | 525/199 |

Primary Examiner—Jeffery Thurlow
Assistant Examiner—Leo B. Tentoni
Attorney, Agent, or Firm—Alexander J. McKillop; Michael G. Gilman; Charles J. Speciale

[57] ABSTRACT

The extrudability of linear polymers of ethylene such as low density copolymers of ethylene and $C_4$–$C_{10}$ olefins (LLDPE) into thin films is improved by adding small amounts, e.g. 250 to 1000 ppm of each of a fluorocarbon polymer, e.g. polyvinylidene fluoride, and of a polyalkylsiloxane, e.g. poly(methyl-octyl-siloxane), to reduce melt fracture, head pressure and extruder power.

9 Claims, No Drawings

LINEAR POLYETHYLENE, FLUOROCARBON POLYMER AND POLYALKYLSILOXANE COMPOSITIONS, AND IMPROVED METHOD OF FILM EXTRUSION USING SAME

BACKGROUND OF THE INVENTION

Linear ethylene polymers such as low density polyethylenes (LLDPE) are widely used in the extrusion of films because of their superior properties compared to high pressure polyethylene (LDPE). However, commercial exploitation of LLDPE resinos is hampered by problems of extrusion. For example, high back pressure and torque due to extremely high shear viscosity of the linear ethylene polymer are encountered. Furthermore, the extruded films exhibit surface distortion related to melt fracture. Accordingly, much effort has been devoted to finding additives, modifying extrusion conditions and changing die materials in order to alleviate some of the problems. This invention relates to a mixture of additives which improves the extrusion characteristics of linear ethylene polymers by reducing melt fracture, head pressure and extruder power.

SUMMARY OF THE INVENTION

The extrudability of linear polymers of ethylene into thin films is improved by adding a fluorocarbon polymer and a polysiloxane in small amounts sufficient to reduce melt fracture, head pressure, and extruder power. The invention relates to both polymer compositions and the improved method cf forming films by extrusion.

DETAILED DESCRIPTION OF THE INVENTION

The linear ethylene polymers which are suitable for use in this invention are known materials which are widely commercially available. The preparation of suitable polymers is described in U.S. Pat. No. 4,076,698, which is incorporated herein by reference. Suitable polymers are generally prepared under low pressure conditions using Ziegler-Natta catalysts or chromium oxide catalysts. The linear polymers are either homopolymers of ethylene or copolymers of ethylene and higher olefins containing 4 to 10 carbon atoms. This invention is particularly concerned with linear low density polyethylenes which are copolymers generally having a density between 0.90 and 0.94, preferably between 0.91 and 0.93.

Flurocarbon polymers which are useful in this invention are described in U.S. Pat. No. 3,125,547, which is incorporated herein by reference in entirety. This patent generally describes a variety of flurocarbon polymers which are useful in improving the extrusion characteristics of various olefin polymers. The addition of a polyalkylsiloxane is not disclosed.

Generally, the fluorocarbon polymer should have melt flow characteristics similar to that of the linear polyethylene polymer such that the fluorocarbon polymer is solid when the polyethylene is solid and fluid when the polyethylene is in the form of a melt. Thus, the melting or softening point of the fluorocarbon polymer should be in the range of 120° to 300° C. and preferably in the range of 150° to 250° C. Both homopolymers and copolymers are useful. Preferably, the polymer will have a fluorine to carbon ratio of at least 1:2.

Monomers which are suitable for production of such polymers include vinylidene fluoride, vinyl fluoride, trifluoroethylene, tetrafluorethylene, hexafluoropropylene and the like. Polyvinylidene fluoride is particularly preferred.

The polyalkylsiloxane can contain entirely methyl-higher alkyl-siloxane units or can include a major proportion of methyl-higher alkyl-siloxane units and a minor proportion of other siloxane units such as dimethylsiloxane units, in which the higher alkyl contains 6 to 18 carbon atoms.

Polyalkylsiloxanes of this kind are commercially available and a poly(methyl-octyl-siloxane) having 8 carbon atoms in the alkyl group was found to be suitable. Generally, the polyalkylsiloxane contains 30 or more alkylsiloxane repeating units, e.g., 30-100 units. Molecular weights in the range of 5,000 to 11,000 are considered suitable.

The fluorocarbon polymer and the polyalkylsiloxane are used in small amounts, generally in the range of 0.01 to 0.5 weight percent of each. Equal proportions of these components have been found to be suitable and, although the proportions can vary widely within the weight percent ranges disclosed, it is preferred that the proportion of the fluorocarbon polymer and the polyalkylsiloxane be in the range of 0.2:1 to 5:1.

The fluorocarbon polymer and the polyalkylsiloxane can be blended with the linear ethylene polymer in any suitable manner. It has been found to be advantageous to prepare a masterbatch containng the linear ethylene polymer which is rich in both the fluorocarbon polymer and the polyalkylsiloxane for blending with additional ethylene polymer to achieve the desired concentration of the additives.

The invention is illustrated by the following non-limiting examples.

EXAMPLE 1

The linear low density polyethylene (LLDPE) used in all the examples was an ethylene-butene copolymer having a density of 0.918 and a melt index of 1 which exhibits severe melt fracture under commercial narrow die gap extrusion conditions. A masterbatch was prepared by admixing the following components in a Brabender mixer at 180° C. for 5 minutes.

| Components | % by Weight |
|---|---|
| Linear Low Density Ethylene-Butene-1 Copolymer | 91.0 |
| Kynar 760[1] | 2.0 |
| Poly(methyl-octyl-siloxane)[2] | 2.0 |
| Superfloss[3] | 5.0 |

[1] A high viscosity polyvinylidene fluoride obtained from Pennwalt Corp.
[2] MW about 6,200 from Petrarch Systems, Inc.
[3] Finely divided diatomaceous earth obtained from Manville Corp.

The resultant blend, containing 2% each of Kynar 760 and poly(methyl-octyl-siloxane), was pelletized for evaluation below.

2.5 parts by weight of the above masterbatch was letdown with 97.5 parts by weight of the LLDPE to give 500 ppm each of Kynar 760 and poly(methyl-octyl-siloxane), and then extruded into strands on a Brabender extruder equipped with a capillary die. The extrusion temperature was 200° C. and the melt flow rate was about 10 g/min., which gives a shear rate about 450 sec$^{-1}$. Reduction in melt fracture began about 6 minutes and the melt fracture was eliminated after 14 minutes. In addition, the head pressure dropped 16% and the extruder power decreased 18% at the end of the 30 minutes of extrusion.

EXAMPLE 2

The concentration of the Kynar and poly(methyl-octyl-siloxane) were further reduced to 250 ppm each by dry blending 1.25 parts by weight of the above masterbatch with 98.75 parts by weight of the LLDPE. The extruder temperature was 201° C. and the melt flow rate was about 10 g/min., which is equivalent to a shear rate of 450 sec$^{-1}$. Reduction in melt fracture began after 11 minutes and the melt fracture was eliminated after 26 minutes. In addition, the head pressure dropped 11% and the extruder power decreased 12% after 30 minutes of extrusion.

COMPARATIVE EXAMPLES

The following control experiments were conducted under the same conditions as the examples described above to show the clear advantage of this invention.

|  |  | Comments |
| --- | --- | --- |
| Control A | LLDPE Only | Severe melt fracture, no reduction in head pressure and extruder power. |
| Control B | LLDPE + 500 ppm Poly(methyl-octyl-siloxane) | Severe melt fracture, no reduction in head pressure. |
| Control C | LLDPE + 500 ppm Kynar 760 | No reduction in extruder power. |

Although the present invention has been described with preferred embodiments, it is to be understood that modifications and variations can be made without departing from the spirit and scope of this invention, as those skilled in the art will readily understand. Such modifications and variations are considered to be within the purview and scope of the appended claims.

I claim:

1. A method of extruding a linear polyethylene polymer composition through a film extruder in which the improvement comprises incorporating 0.01 to 0.5 weight percent of said composition of a fluorocarbon polymer having a fluorine to carbon ratio of at least 1:2 which is fluid at temperatures of between 120° C. and 300° C.; and 0.01 to 0.5 weight percent of said composition of a polyalkylsiloxane consisting entirely of methyl-higher alkyl siloxane units or consisting of a major proportion of methyl-higher alkyl siloxane units and a minor proportion of other siloxane units, in which the fluorocarbon polymer and the polyalkylsiloxane are present in amounts to reduce melt fracture, reduce head pressure and reduce extruder power compared to extrusion without the fluorocarbon polymer and the polyalkylsiloxane.

2. The method claim 1 in which said linear polyethylene polymer is a copolymer of ethylene and a higher olefin containing 4 to 10 carbon atoms, having a density of 0.90 to 0.94.

3. The method of claim 1 in which said linear polyethylene is a copolymer of ethylene and butene having a density of 0.90 and 0.94.

4. The method of claim 1 in which said linear polyethylene is a copolymer of ethylene and hexene having a density of 0.90 and 0.94.

5. The method of claim 1 in which said linear polyethylene is a copolymer of ethylene and octene having a density of 0.90 and 0.94.

6. The method of claim 1 in which said fluorocarbon polymer is polyvinylidene fluoride.

7. The method of claim 6 in which said linear polyethylene polymer is a copolymer of ethylene and a higher olefin containing 4 to 10 carbon atoms, having a density of 0.90 and 0.94.

8. The method of claim 4 in which said fluorocarbon polymer is polyvinylidene fluoride.

9. The method of claim 1 in which said fluorocarbon polymer comprises 0.01 to 0.05 weight percent of the composition and said polyalkylsiloxane comprises 0.01 and 0.05 weight percent of the composition.

* * * * *